United States Patent
Liu et al.

(10) Patent No.: US 10,243,726 B2
(45) Date of Patent: Mar. 26, 2019

(54) SIGNAL TRANSCEIVING DEVICE AND METHODS FOR DETECTING A SYNCHRONIZATION POINT IN A SIGNAL

(71) Applicant: PRINCETON TECHNOLOGY CORPORATION, New Taipei (TW)

(72) Inventors: Chia-Liang Liu, New Taipei (TW); Yi-Hsueh Chung, New Taipei (TW)

(73) Assignee: PRINCETON TECHNOLOGY CORPORATION, New Taipei (TW)

( * ) Notice: Subject to any disclaimer, the term of this patent is extended or adjusted under 35 U.S.C. 154(b) by 0 days.

(21) Appl. No.: 15/905,464

(22) Filed: Feb. 26, 2018

(65) Prior Publication Data
US 2018/0270044 A1 Sep. 20, 2018

(30) Foreign Application Priority Data
Mar. 15, 2017 (TW) .............................. 106108483 A

(51) Int. Cl.
H04L 7/04 (2006.01)
H04B 3/54 (2006.01)

(52) U.S. Cl.
CPC .............. *H04L 7/042* (2013.01); *H04B 3/54* (2013.01)

(58) Field of Classification Search
CPC . H04L 7/041; H04L 7/042; H04L 7/06; H04L 7/10; H04B 3/54; H04B 3/542
USPC ................ 375/354, 356, 362, 364, 365, 368
See application file for complete search history.

(56) References Cited

U.S. PATENT DOCUMENTS

| | | | | |
|---|---|---|---|---|
| 6,891,815 B1 * | 5/2005 | Song | ..................... | H04B 1/707 370/335 |
| 8,619,385 B1 * | 12/2013 | Guo | ................... | G11B 5/59655 360/39 |
| 2007/0104297 A1 * | 5/2007 | Gorday | ................. | H04B 1/707 375/343 |
| 2007/0153761 A1 * | 7/2007 | Fechtel | ............... | H04B 1/7077 370/350 |

OTHER PUBLICATIONS

Office Action dated Apr. 18, 2018 issued corresponding application TW106108483 with Search Report, 4 pages.
Ying-Cong Huang et al, "Narrow band power line communication transceiver design for household control systems," Journal of Engineering, National Chung Hsing University, Jun. 1, 2011, pp. 1-22, vol. 22, No. 1.

* cited by examiner

*Primary Examiner* — Siu M Lee
(74) *Attorney, Agent, or Firm* — Muncy, Geissler, Olds & Lowe, P.C.

(57) ABSTRACT

A signal transceiving device includes a transceiver and a microprocessor. The transceiver receives a signal from a power line. The microprocessor performs correlation calculation for the signal with a first predetermined pattern to obtain a plurality of first calculation results, performs correlation calculation for the signal with a second predetermined pattern to obtain a plurality of second calculation results, generates a plurality of weighting values according to the first calculation results and determines a position of a synchronization point in the signal according to the weighting values. When the weighting value corresponding to a sample point of the signal satisfies a first condition and the second calculation result corresponding to the sample point satisfies a second condition, the microprocessor determines to use the sample point as the synchronization point.

15 Claims, 6 Drawing Sheets

SIGNAL TRANSCEIVING DEVICE AND METHODS FOR DETECTING A SYNCHRONIZATION POINT IN A SIGNAL

CROSS REFERENCE TO RELATED APPLICATIONS

This Application claims priority of Taiwan Patent Application No. 106108483, filed on Mar. 15, 2017, the entirety of which is incorporated by reference herein.

BACKGROUND OF THE INVENTION

Field of the Invention

The invention relates to a signal processing method and apparatus, which is capable of avoiding the erroneous detection of the synchronization point in the voltage signal due to existence of noises.

Description of the Related Art

In order to facilitate the optimal allocation and operation of power resources, the trend today has been the construction of smart power networks. In order to achieve this, a power information gathering and analysis system, such as the Advanced Metering Infrastructure (AMI), which has a two-way communication function, must be established to enable the automation and informationization of power systems.

The function of two-way communication not only allows the power company to receive information (i.e. power information) about the electricity consumer without having to read the meter directly, but also to provide electricity information to the consumer that can help consumers adjust their electricity usage habits. For example, the power company may make recommendations to electricity consumers about how to adjust their usage in order to reduce their electrical bills.

Since important information about electricity is to be carried in a continuously transmitted voltage signal, it is important to identify the synchronization point in the voltage signal (i.e., the starting point of the useful electricity information carried therein). However, it is difficult to avoid noise interference in power line transmission. Therefore, a novel signal processing method and apparatus which can effectively avoid erroneous detection of synchronization points due to noise presented in the voltage signal are proposed.

BRIEF SUMMARY OF THE INVENTION

Signal transceiving devices and methods for detecting a position of a synchronization point in a signal are provided. An exemplary embodiment of a method for detecting a position of a synchronization point in a signal comprises: receiving a signal, wherein the signal comprises a plurality of sampling points; performing correlation calculation for the signal with a first predetermined pattern to obtain a plurality of first calculation results; performing correlation calculation for the signal with a second predetermined pattern to obtain a plurality of second calculation results; generating a plurality of weighting values according to the first calculation results; and determining a position of a synchronization point in the signal according to the weighting values. When the weighting value corresponding to a sampling point of the signal satisfies a first condition and the second calculation result corresponding to the sampling point satisfies a second condition, the sampling point is determined as the synchronization point.

An exemplary embodiment of a signal transceiving device comprises a transceiver and a microprocessor. The transceiver is configured to receive a signal from a power line. The microprocessor is configured to perform correlation calculation for the signal with a first predetermined pattern to obtain a plurality of first calculation results, perform correlation calculation for the signal with a second predetermined pattern to obtain a plurality of second calculation results, generate a plurality of weighting values according to the first calculation results and determine a position of a synchronization point in the signal according to the weighting values. When the weighting value corresponding to a sample point of the signal satisfies a first condition and the second calculation result corresponding to the sample point satisfies a second condition, the microprocessor determines to use the sample point as the synchronization point.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
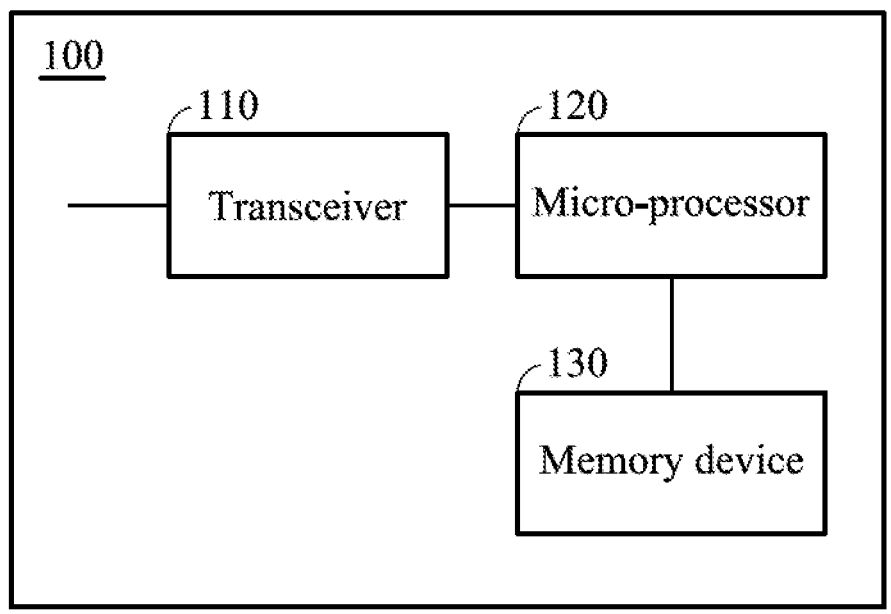
FIG. 1 shows an exemplary block diagram of a signal transceiving device according to an embodiment of the invention.

FIG. 1 shows an exemplary block diagram of a signal transceiving device according to an embodiment of the invention. The signal transceiving device 100 may be configured inside of an electricity meter, or configured inside of a plug of an electrical appliance. The signal transceiving device 100 may provide a two-way communication function, for receiving the voltage signal from the power company via the power line and transmitting the voltage signal to the power company via the power line, where the electricity information of the electricity consumer may be continuously carried in the transmitted voltage signal.

The signal transceiving device 100 may comprise a transceiver 110, a microprocessor 120 and a memory device 130. The transceiver 110 is configured to receive the signal from the power line and transmit the signal onto the power line. The microprocessor 120 is configured to process the signal. For example, the microprocessor 120 may demodulate the received signals, or modulate the signals to be transmitted. The microprocessor 120 may comprise an analog-digital conversion module configured to perform analog-to-digital conversion on the received signal or perform digital-to-analog conversion on the signal to be transmitted. It should be noted that, in the embodiments of the invention, the signal transceiving device 100 may also comprise corresponding analog-digital converting circuits for performing the conversions discussed above. The memory device 130 may store the electricity information regarding the usage records of the electricity consumer and the related system information.

As discussed above, since the important electricity information is carried in the voltage signal that is continuously transmitted on the power line, how to identify the synchronization point in the voltage signal (i.e., the starting point of the useful electricity information carried therein) is an important issue to be solved. The proposed methods for precisely detecting the position of a synchronization point in a signal will be discussed in the following paragraphs.

Figure 2:
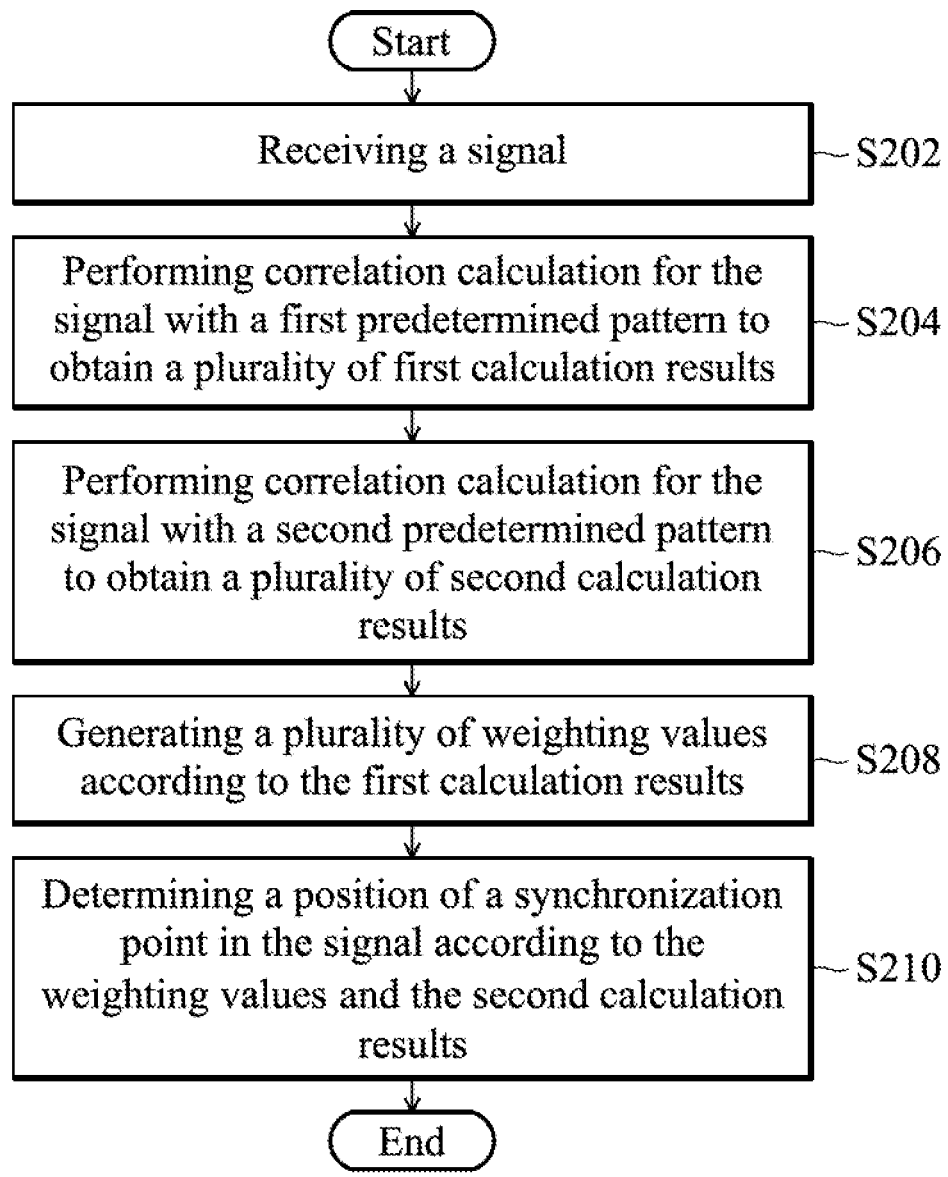
FIG. 2 is an exemplary flow chart of a method for detecting the position of a synchronization point in a signal according to an embodiment of the invention.

FIG. 2 is an exemplary flow chart of a method for detecting the position of a synchronization point in a signal according to an embodiment of the invention. First of all, a signal is received by the signal transceiving device 100 (Step S202). The signal may be the signal received from the power line and may be the digital signal that has been analog-to-digital converted by the corresponding analog-digital converting circuits or the microprocessor 120. Therefore, the signal may comprise a plurality of sampling points. Next, a correlation calculation is performed by the microprocessor 120 for the signal with a first predetermined pattern to obtain a plurality of first calculation results (Step S204), and a correlation calculation is performed by the microprocessor 120 for the signal with a second predetermined pattern to obtain a plurality of second calculation results (Step S206). Next, a plurality of weighting values are generated by the microprocessor 120 according to the first calculation results (Step S208). Finally, the position of a synchronization point in the signal is determined by the microprocessor 120 according to the weighting values and the second calculation results (Step S210). When the weighting value corresponding to a sampling point of the signal satisfies a first condition and the second calculation result corresponding to that sampling point satisfies a second condition, the microprocessor 120 may determine to use the sampling point as the synchronization point. When the position of the synchronization point is determined, the microprocessor 120 may further confirm that subsequent signals contain valid electricity information and then a series of signal reception and processing procedures can be initiated to retrieve important electricity information.

According to a first embodiment of the invention, the correlation calculation performed in step S204 may be the cross-correlation performed on the received signal with a predetermined preamble symbol, and the correlation calculation performed in step S206 may be the auto-correlation performed on the received signal and the delayed version of the received signal.

According to an embodiment of the invention, the preamble signal may be a chirp signal which has a frequency that varies (increases or decreases) with time. The predetermined preamble symbol may be one symbol of the preamble signal, which is a pattern known by the transmitter and the receiver, and the predetermined preamble symbol may be stored in the memory device 130. Before transmitting the valid electricity information, one or more (for example, 8) preamble symbols P_Symbol may be inserted before the signal and one or more (for example, 1.5) inverted preamble symbols M_Symbol may be inserted after the preamble symbols. The voltage level of the inverted preamble symbol M_Symbol is the inverse of that of the preamble symbol P_Symbol. Therefore, the preamble symbol P_Symbol and the inverted preamble symbol M_Symbol are in inverted phase relationship.

According to a first embodiment of the invention, the microprocessor 120 may sequentially obtain N sampling points in the signal by using a sliding window containing N points to perform the correlation calculation discussed above, where there are N sampling points comprised in one symbol of the system. The predetermined preamble symbol may also comprise N sampling points, where N is a positive integer. For example, N=256.

In step S204, the microprocessor 120 may sequentially obtain N sampling points in the signal and perform a cross-correlation calculation for the N sampling points with the predetermined preamble symbol to obtain the first calculation results.

In step S206, the microprocessor 120 may sequentially take N sampling points in the signal as the first test symbol, and may delay the signal by N sampling points and then sequentially take N sampling points of the delayed signal as the second test symbol. The microprocessor 120 may then perform an auto-correlation calculation on the first test symbol and the second test symbol to obtain the second calculation results.

In step S208, the microprocessor 120 may establish a weighting table, where the weighting table may comprise N fields, for recording the corresponding weighting values for each sampling point based on the corresponding indexes. In the weighting table, the weighting values corresponding to the n-th point, the (n+256)-th point, the (n+512)-th point . . . , may all be accumulated in the same n-th field, where 0<n<=N. In other words, the weighting values of the sampling points having the same result when taking their index value index_V to perform the module operation such as (index_V mod N) will be accumulated or recorded in (or correspond to) the same field of the weighting table. The weighting values in the weighting table will be initialized as 0. The microprocessor 120 may then sequentially determine whether the first calculation result of each sampling point is greater than a first threshold value TH_1. When the first calculation result is greater than the first threshold value TH_1, the microprocessor 120 increases the weighting value corresponding to that sampling point. When the first calculation result is not greater than the first threshold value TH_1 and when the weighting value corresponding to that sampling point is greater than 0, the microprocessor 120 decreases the weighting value corresponding to that sampling point.

Finally, in step S210, when the weighting value corresponding to a sampling point of the signal is greater than a second threshold value TH_2 and the second calculation result corresponding to that sampling point is smaller than a third threshold value TH_3, the microprocessor 120 may determine to take or regard this sample point as the synchronization point. After the position of the synchronization point is determined, the microprocessor 120 may further confirm that subsequent signals contain valid electricity information and then a series of signal reception and processing procedures can be initiated to retrieve important electricity information.

Figure 3:
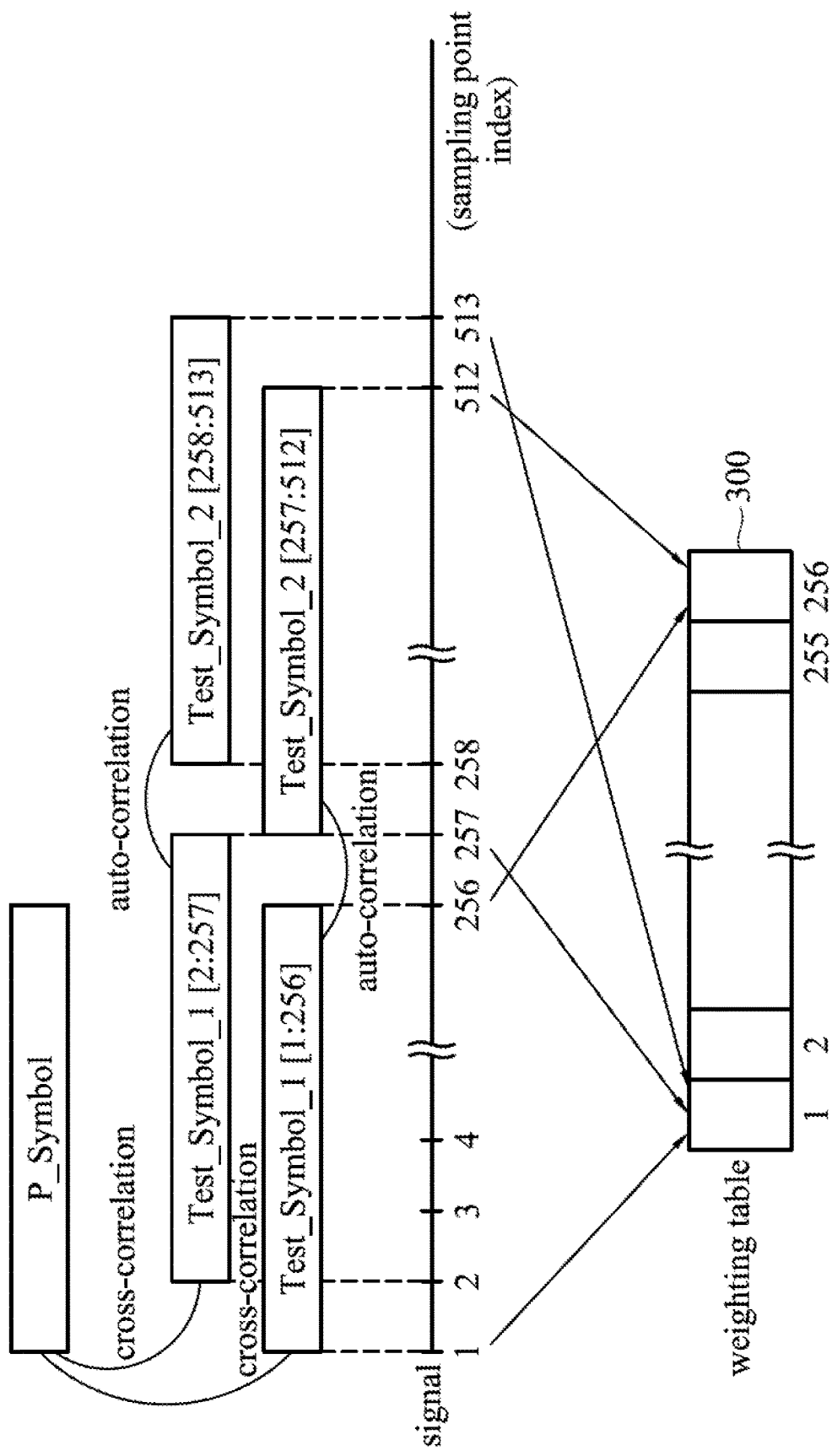
FIG. 3 shows a schematic diagram of performing the correlation calculation according to the first embodiment of the invention.

FIG. 3 shows a schematic diagram of performing the correlation calculation according to the first embodiment of the invention. Suppose that the correlation calculation is performed from the first sampling point of the signal and N=256, the microprocessor 120 may use the first sampling point~the 256-th sampling point as the first test symbol (as shown, the first test symbol is Test_Symbol_[1:256]), and perform a cross-correlation calculation for the first test symbol with the predetermined preamble symbol P_Symbol to obtain the first calculation result corresponding to the first sampling point. The microprocessor 120 may further use the 257-th sampling point~the 512-th sampling point as the second test symbol (as shown, the second test symbol is Test_Symbol_2[257:512]), and perform an auto-correlation calculation for the first test symbol and the second test symbol to obtain the second calculation result corresponding to the first sampling point.

Next, the microprocessor 120 may obtain the test symbols (as shown, the first test symbol is Test_Symbol_[2:257] and the second test symbol Test_Symbol_2[258:513]) from the second sampling point data and perform the cross-correlation calculation and the auto-correlation calculation as discussed above to obtain the corresponding first calculation result and the second calculation result corresponding to the second sampling point, and so on.

Next, the microprocessor 120 may sequentially compare the first calculation result of each sampling point with the first threshold value TH_1 and record the comparison result in weighting table 300. As shown in FIG. 3, the content of the first field in the weighting table 300 may correspond to the first, 257-th, 513-th . . . sampling points, and so on. To be more specific, when the first calculation result corresponding to the n-th sampling point is greater than the first threshold TH_1 (as an example, TH_1=0.2), this means that the preamble symbol in the signal is detected, and the microprocessor 120 may increase the weighting value corresponding to the n-th field by one (suppose that the current n<=256). When the first calculation result corresponding to the (n+256)-th sampling point is also greater than the first threshold TH_1, this means that the preamble symbol in the signal is detected, and the microprocessor 120 may increase the weighting value corresponding to the n-th field by one.

However, when the first calculation result corresponding to the (n+256)-th sampling point is not greater than the first threshold TH_1, this means that the preamble symbol in the signal is not detected. Meanwhile, when the weighting value corresponding to the (n+256)-th sampling point (that is, the weighting value corresponding to the n-th field) is greater than 0, the microprocessor 120 may decrease the weighting value corresponding to the (n+256)-th sampling point (that is, the weighting value corresponding to the n-th field) by one. When the weighting value corresponding to the (n+256)-th sampling point equals 0, the microprocessor 120 will not decrease the weighting value corresponding to the (n+256)-th sampling point. If the preamble symbol is not detected at the (n+256)-th sampling point, it means that the detection result previously obtained at the (n)-th sampling point may be an erroneous detection. In this manner, the microprocessor 120 may rebate the weighting value corresponding to the n-th field to remove the effect of such erroneous detection.

Figure 4:
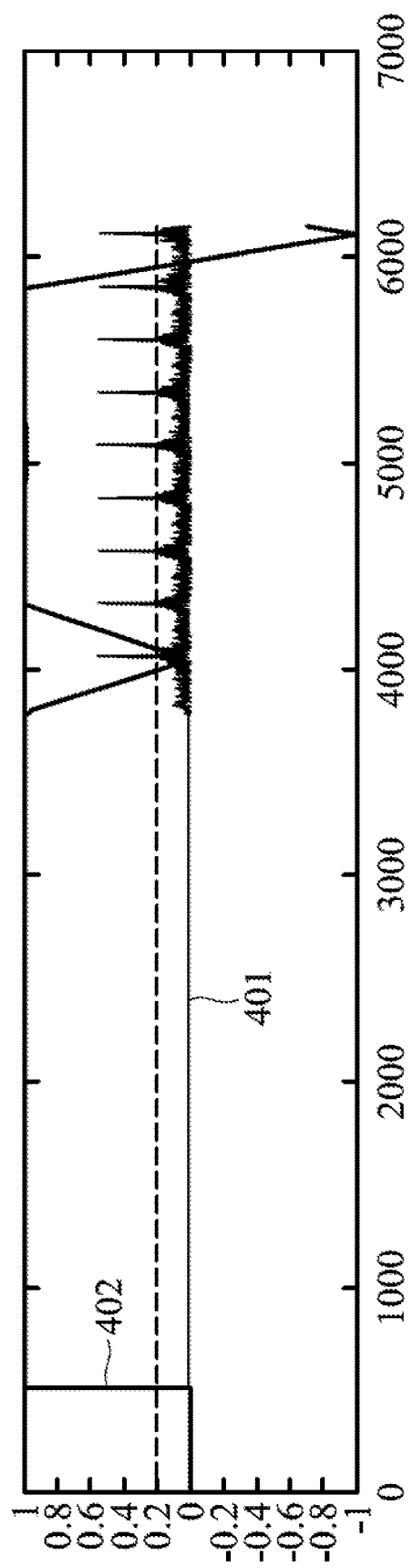
FIG. 4 is a schematic diagram showing the first calculation result and the second calculation result of the sampling points according to the first embodiment of the invention.

Finally, the microprocessor 120 may determine the position of the synchronization point according to the weighting value and the second calculation results. FIG. 4 is a schematic diagram showing the first calculation result and the second calculation result of the sampling points according to the first embodiment of the invention, where the X-axis represents the index of the sampling point and the Y-axis represents the correlation calculation results. Line 401 shows the first calculation result of each sampling point and line 402 shows the second calculation result of each sampling point. When the auto-correlation calculation is performed on the inverted preamble symbol M_Symbol, the second calculation result begins to change to a negative value.

Therefore, according to the first embodiment of the invention, as an example, when the weighting value corresponding to one sampling point of the signal is greater than the second threshold value TH_2 (as an example, TH_2=3, that is, there should be at least three sampling points before the current sampling point having a first calculation result that is greater than the first threshold value), and the second calculation result of the current sampling point is smaller than a third threshold value TH_3 (as an example, TH_3=0), it means that the inserted multiple preamble symbols P_Symbol and inverted preamble symbol M_Symbol have been detected.

In this manner, the microprocessor 120 may determine to use the current sampling point (or any other sampling point adjacent to the current sampling point) as the synchronization point of the signal. When the position of the synchronization point is detected, the microprocessor 120 may further confirm that subsequent signals contain valid electricity information and then a series of signal reception and processing procedures can be initiated to retrieve important electricity information.

According to a second embodiment of the invention, the correlation calculation performed in step S204 may be the cross-correlation performed on the received signal with a first predetermined pattern PP formed by two predetermined preamble symbols, and the correlation calculation performed in step S206 may be the cross-correlation performed on the received signal and a second predetermined pattern PM formed by one predetermined preamble symbol and one inverted preamble symbol.

According to a second embodiment of the invention, the microprocessor 120 may sequentially obtain 2N sampling points in the signal by using a sliding window containing 2N points to perform the correlation calculation as discussed above, where there are N sampling points comprised in one symbol of the system. The predetermined preamble symbol and the inverted preamble symbol may both comprise N sampling points.

In step S204, the microprocessor 120 may sequentially obtain 2N sampling points in the signal and perform a cross-correlation calculation for the 2N sampling points with the first predetermined pattern PP to obtain the first calculation results.

In step S206, the microprocessor 120 may sequentially take 2N sampling points in the signal and perform a cross-correlation calculation for the 2N sampling points with the second predetermined pattern PM to obtain the second calculation results.

In step S208, the microprocessor 120 may establish a weighting table, where the weighting table may comprise N fields, for recording the corresponding weighting values for each sampling point based on the corresponding indexes. In the weighting table, the weighting values corresponding to the n-th point, the (n+256)-th point, the (n+512)-th point . . . , may all be accumulated in the same n-th field, where 0<n<=N. In other words, the weighting values of the sampling points having the same result when taking their index value index_V to perform the module operation such as (index_V mod N) will be accumulated or recorded in (or correspond to) the same field of the weighting table. The weighting values in the weighting table will be initialized as 0. The microprocessor 120 may then sequentially determine whether the first calculation result of each sampling point is greater than a first threshold value TH_1. When the first calculation result is greater than the first threshold value TH_1, the microprocessor 120 increases the weighting value corresponding to that sampling point. When the first calculation result is not greater than the first threshold value TH_1 and when the weighting value corresponding to that sampling point is greater than 0, the microprocessor 120 decreases the weighting value corresponding to that sampling point.

Finally, in step S210, when the weighting value corresponding to a sampling point of the signal is greater than a second threshold value TH_2 and the second calculation result corresponding to that sampling point is greater than a fourth threshold value TH_4, the microprocessor 120 may determine to take or regard this sample point as the synchronization point. After the position of the synchronization point is determined, the microprocessor 120 may further confirm that subsequent signals contain valid electricity information and then a series of signal reception and processing procedures can be initiated to retrieve important electricity information.

Figure 5:
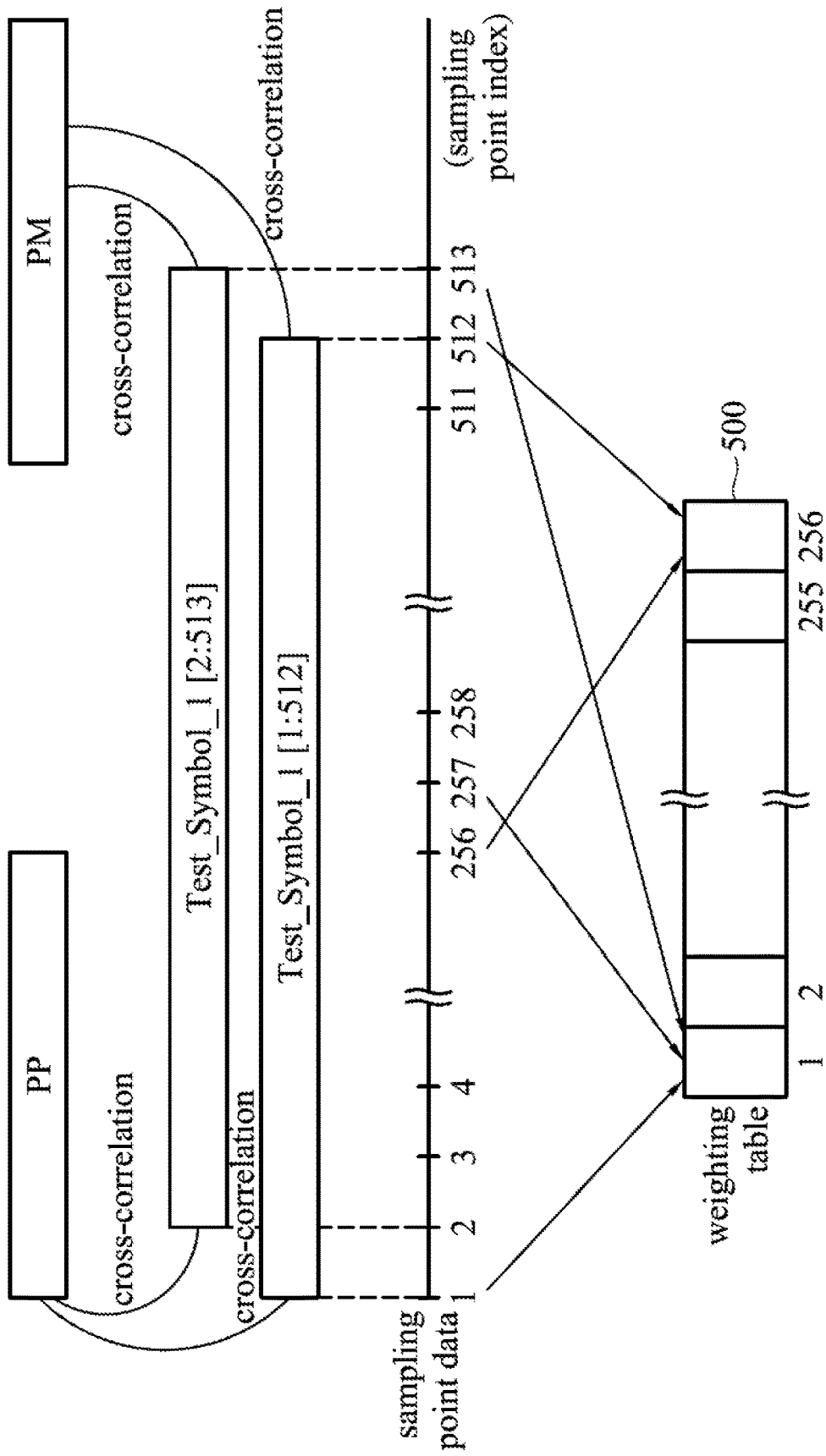
FIG. 5 shows a schematic diagram of performing the correlation calculation according to the second embodiment of the invention.

FIG. 5 shows a schematic diagram of performing the correlation calculation according to the second embodiment of the invention. Suppose that the correlation calculation is performed from the first sampling point of the signal, the microprocessor 120 may use the first sampling point~the 512-th sampling point as the test symbol (as shown, the test symbol is Test_Symbol [1:512]), and perform a cross-correlation calculation for the test symbol with the first predetermined pattern PP and the second predetermined pattern PM, respectively, so as to obtain the first calculation result and the second calculation result corresponding to the first sampling point.

Next, the microprocessor 120 may obtain the test symbol (as shown, the test symbol Test_Symbol [2:513]) from the second sampling point data and perform the cross-correlation calculation discussed above to obtain the corresponding first calculation result and the second calculation result corresponding to the second sampling point, and so on.

Next, the microprocessor 120 may sequentially compare the first calculation result of each sampling point with the first threshold value TH_1 and record the comparison result in weighting table 500. As shown in FIG. 5, the content of the first field in the weighting table 500 may correspond to the first, 257-th, 513-th . . . sampling points, and so on. To be more specific, when the first calculation result corresponding to the n-th sampling point is greater than the first threshold TH_1, this means that the preamble symbol in the signal is detected, and the microprocessor 120 may increase the weighting value corresponding to the n-th field by one (suppose that the current n<=256). When the first calculation result corresponding to the (n+256)-th sampling point is also greater than the first threshold TH_1, this means that the preamble symbol in the signal is detected, and the microprocessor 120 may increase the weighting value corresponding to the n-th field by one.

However, when the first calculation result corresponding to the (n+256)-th sampling point is not greater than the first threshold TH_1, this means that the preamble symbol in the signal is not detected. Meanwhile, when the weighting value corresponding to that sampling point (that is, the weighting value corresponding to the n-th field) is greater than 0, the microprocessor 120 may decrease the weighting value corresponding to the (n+256)-th sampling point (that is, the weighting value corresponding to the n-th field) by one. When the weighting value corresponding to that sampling point equals 0, the microprocessor 120 will not decrease the weighting value corresponding to the (n+256)-th sampling point. If the preamble symbol is not detected at the (n+256)-th sampling point, it means that the detection result previously obtained at the (n)-th sampling point may be an erroneous detection. In this manner, the microprocessor 120 may rebate the weighting value corresponding to the n-th field to remove the effect of such erroneous detection.

Figure 6A:
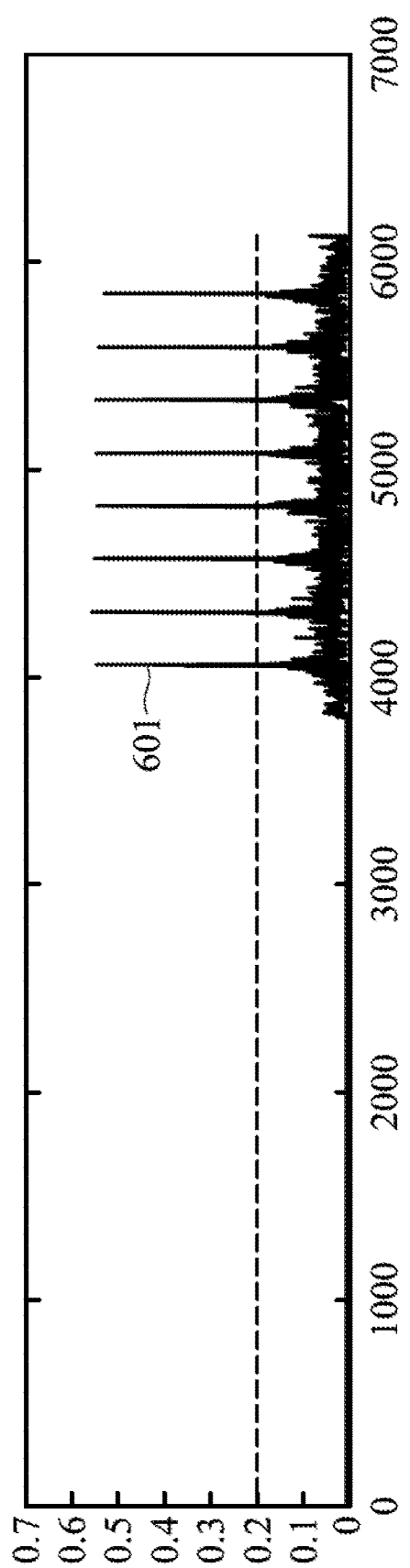
FIG. 6A is a schematic diagram showing the first calculation result of the sampling points according to the second embodiment of the invention.
Figure 6B:
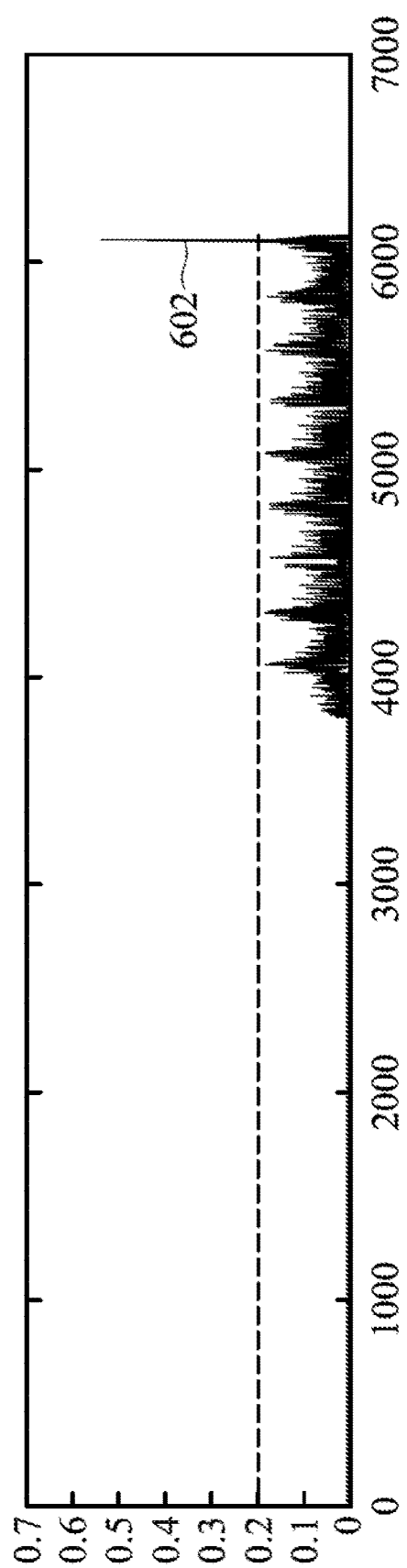
FIG. 6B is a schematic diagram showing the second calculation result of the sampling points according to the second embodiment of the invention.

Finally, the microprocessor 120 may determine the position of the synchronization point according to the weighting value and the second calculation results. FIG. 6A and FIG. 6B are schematic diagrams respectively showing the first calculation result and the second calculation result of the sampling points according to the second embodiment of the invention, where the X-axis represents the index of the sampling point and the Y-axis represents the correlation calculation results. Line 601 shows the first calculation result of each sampling point and line 602 shows the second calculation result of each sampling point. As shown in the figures, when the correlation calculation is performed on the inverted preamble symbol M_Symbol, peak values are generated in the second calculation result.

Therefore, according to the second embodiment of the invention, as an example, when the weighting value corresponding to one sampling point of the signal is greater than the second threshold value TH_2 (as an example, TH_2=3, that is, there should be at least three sampling points before the current sampling point having a first calculation result that is greater than the first threshold value), and the second calculation result of the current sampling point is smaller than a fourth threshold value TH_4 (as an example, TH_4=0.2), it means that the inserted multiple preamble symbols P_Symbol and inverted preamble symbol M_Symbol have been detected.

In this manner, the microprocessor 120 may determine to use the current sampling point (or any other sampling point adjacent to the current sampling point) as the synchronization point of the signal. When the position of the synchronization point is detected, the microprocessor 120 may further confirm that subsequent signals contain valid electricity information and then a series of signal reception and processing procedures can be initiated to retrieve important electricity information.

As discussed above, in the first and second embodiments of the invention, not only can the preamble symbol transmitted in the signal be rapidly detected, the detection accuracy can be improved further by continuously inserting multiple preamble signals in the voltage signal. In addition, the mechanism of calculating the weighting values is applied in the embodiments of the invention, which can also effectively avoid false detection of the synchronization point due to the erroneous detection of the preamble signal.

The embodiments of the present invention can be implemented in any of numerous ways. For example, the embodiments may be implemented using hardware, software or a combination thereof. It should be appreciated that any component or collection of components that perform the functions described above can be generically considered as one or more processors that control the function discussed above. The one or more processors can be implemented in numerous ways, such as with dedicated hardware, or with general-purpose hardware that is programmed using microcode or software to perform the functions recited above.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for detecting a position of a synchronization point in a signal, comprising:
   receiving a signal, wherein the signal comprises a plurality of sampling points;
   performing correlation calculation for the signal with a first predetermined pattern to obtain a plurality of first calculation results;
   performing correlation calculation for the signal with a second predetermined pattern to obtain a plurality of second calculation results;
   generating a plurality of weighting values according to the first calculation results; and
   determining a position of a synchronization point in the signal according to the weighting values,
   wherein when the weighting value corresponding to a sampling point of the signal satisfies a first condition and the second calculation result corresponding to the sampling point satisfies a second condition, the sampling point is determined as the synchronization point.

2. The method as claimed in claim 1, wherein the first predetermined pattern comprises N points of data, N is a positive integer, and wherein the step of performing correlation calculation for the signal with the first predetermined pattern to obtain the first calculation results further comprises:
   obtaining N sampling points in the signal and performing cross-correlation calculation for the N sampling points in the signal with the first predetermined pattern.

3. The method as claimed in claim 1, wherein the second predetermined pattern is a delayed version of the signal, and wherein the step of performing correlation calculation for the signal with the second predetermined pattern to obtain the second calculation results further comprises:
   delaying the signal for N sampling points to obtain a delayed signal; and
   performing auto-correlation calculation for the signal with the delayed signal.

4. The method as claimed in claim 1, wherein the step of generating the weighting values according to the first calculation results further comprises:
   determining whether the first calculation result corresponding to the sampling point is greater than a first threshold;
   when the first calculation result is greater than the first threshold, increasing the weighting value corresponding to the sampling point; and
   when the first calculation result is not greater than the first threshold and when the weighting value corresponding to the sampling point is greater than zero, decreasing the weighting value corresponding to the sampling point.

5. The method as claimed in claim 1, wherein the first condition is that the weighting value corresponding to the sampling point is greater than a second threshold, and the second condition is that the second calculation result corresponding to the sampling point is smaller than a third threshold.

6. The method as claimed in claim 1, wherein the first predetermined pattern and the second predetermined pattern respectively comprise 2N points of data, and wherein a portion of the first predetermined pattern and a portion of the second predetermined pattern are in inverted phase relationship, and wherein the correlation calculations are cross-correlation calculations.

7. The method as claimed in claim 1, wherein the step of performing correlation calculation for the signal with the first predetermined pattern to obtain the first calculation results further comprises:
   obtaining 2N sampling points in the signal and performing cross-correlation calculation for the 2N sampling points in the signal with the first predetermined pattern, and
   wherein the step of performing correlation calculation for the signal with the second predetermined pattern to obtain the second calculation results further comprises:
   obtaining 2N sampling points in the signal and performing cross-correlation calculation for the 2N sampling points in the signal with the second predetermined pattern.

8. The method as claimed in claim 1, wherein the first condition is that the weighting value corresponding to the sampling point is greater than a second threshold, and the second condition is that the second calculation result corresponding to the sampling point is greater than a fourth threshold.

9. A signal transceiving device, comprising:
   a transceiver, configured to receive a signal from a power line; and
   a microprocessor, configured to perform correlation calculation for the signal with a first predetermined pattern to obtain a plurality of first calculation results, perform correlation calculation for the signal with a second predetermined pattern to obtain a plurality of second calculation results, generate a plurality of weighting values according to the first calculation results and determine a position of a synchronization point in the signal according to the weighting values,
   wherein when the weighting value corresponding to a sample point of the signal satisfies a first condition and the second calculation result corresponding to the sample point satisfies a second condition, the microprocessor determines to use the sample point as the synchronization point.

10. The signal transceiving device as claimed in claim 9, wherein the first predetermined pattern comprises N points of data, N is a positive integer, and wherein the correlation calculation performed for the signal with the first predetermined pattern is cross-correlation calculation.

11. The signal transceiving device as claimed in claim 9, wherein the second predetermined pattern is a delayed version of the signal, and wherein the correlation calculation performed for the signal with the second predetermined pattern is auto-correlation calculation.

12. The signal transceiving device as claimed in claim 9, wherein the microprocessor further determines whether the first calculation result corresponding to the sampling point is greater than a first threshold, when the first calculation result is greater than the first threshold, the microprocessor increases the weighting value corresponding to the sampling point, and when the first calculation result is not greater than the first threshold and when the weighting value corresponding to the sampling point is greater than zero, the microprocessor decreases the weighting value corresponding to the sampling point.

13. The signal transceiving device as claimed in claim 9, wherein the first condition is that the weighting value corresponding to the sampling point is greater than a second threshold, and the second condition is that the second calculation result corresponding to the sampling point is smaller than a third threshold.

14. The signal transceiving device as claimed in claim 9, wherein the first predetermined pattern and the second predetermined pattern respectively comprise 2N points of data, and wherein a portion of the first predetermined pattern and a portion of the second predetermined pattern are in inverted phase relationship, and wherein the correlation calculations are cross-correlation calculations.

15. The signal transceiving device as claimed in claim 9, wherein the first condition is that the weighting value corresponding to the sampling point is greater than a second threshold, and the second condition is that the second calculation result corresponding to the sampling point is greater than a fourth threshold.

* * * * *